J. E. KENNEDY.
LUBRICATED BEARING FOR CRUSHING AND PULVERIZING MACHINES.
APPLICATION FILED MAY 31, 1913.
1,176,833.
Patented Mar. 28, 1916.
2 SHEETS—SHEET 2.
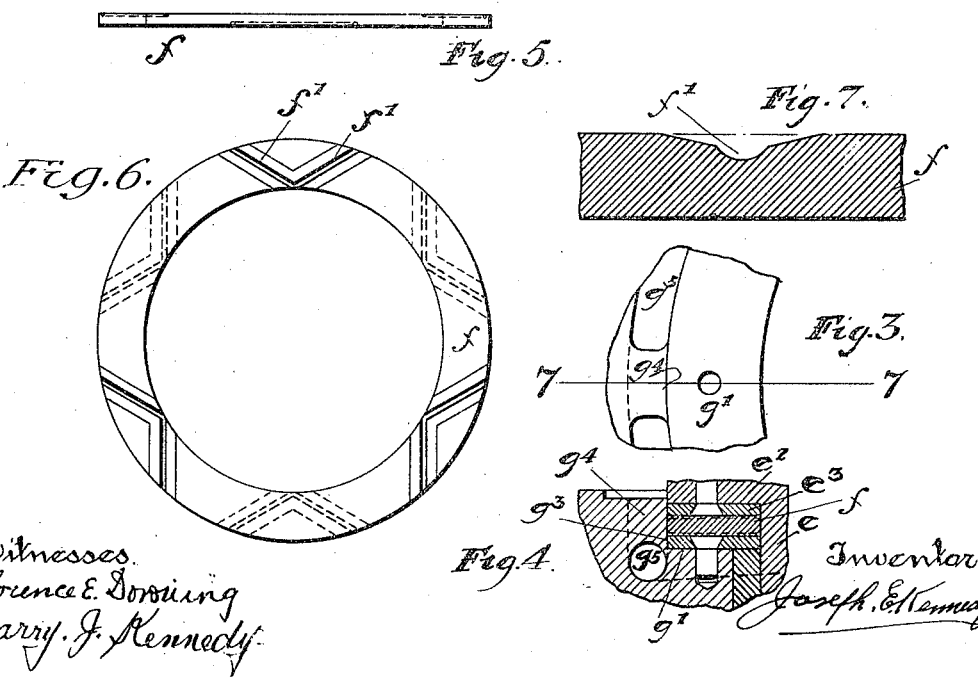

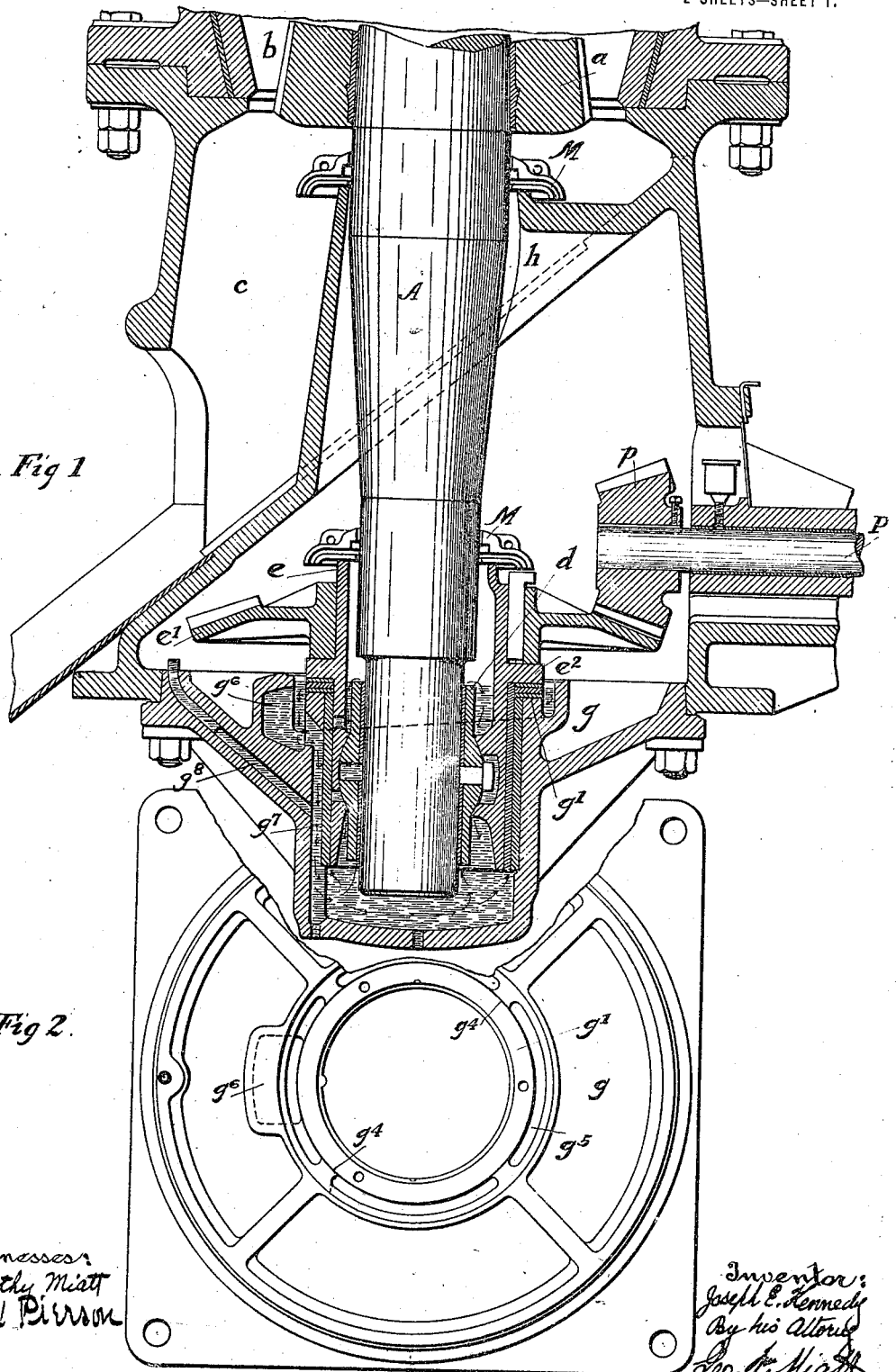
J. E. KENNEDY.
LUBRICATED BEARING FOR CRUSHING AND PULVERIZING MACHINES.
APPLICATION FILED MAY 31, 1913.
1,176,833.
Patented Mar. 28, 1916.
2 SHEETS—SHEET 1.

UNITED STATES PATENT OFFICE.

JOSEPH E. KENNEDY, OF NEW YORK, N. Y.

LUBRICATED BEARING FOR CRUSHING AND PULVERIZING MACHINES.

1,176,833.　　　Specification of Letters Patent.　　Patented Mar. 28, 1916.

Application filed May 31, 1913.　Serial No. 770,833.

*To all whom it may concern:*

Be it known that I, JOSEPH E. KENNEDY, a citizen of the United States, and a resident of the borough of Manhattan, city, county, and State of New York, have invented certain new and useful Improvements in Lubricated Bearings for Crushing and Pulverizing Machines, of which the following is a specification.

My invention relates to the type of crushing and pulverizing mechanism set forth in my Letters Patent No. 1,085,867, dated Feb. 3rd, 1914, and No. 1,090,216, dated Mar. 17th, 1914, in which the lower extremity of a gyratory shaft is journaled in a rotatable eccentric bearing—said shaft carrying a truncated conical crusher head positioned in an oppositely inclined concave crusher chamber, from the lower portion of which the crushed and pulverized material escapes above the gear of chamber. Hence, aside from the protection of the latter chamber from dust by suitable means, as by the dust guard shown and described herein by way of example and claimed in my concurrent application Serial No. 790,785, filed Sept. 19th, 1913, which is a subdivision of the present application, an important factor is the effectual and continuous lubrication of the eccentric bearing, rotatable sleeve, &c., within the gear chamber. Failure of lubrication of the running parts from any cause is a serious danger in machines of this class, resulting in excessive wear, and even the melting of the Babbitt metal, and frequently necessitating a shut-down of the whole apparatus and costly repairs thereto—disadvantages and dangers which I obviate largely by providing for a continuous and positive circulation of lubricating oil between opposed bearing surfaces as hereinafter more fully set forth.

In the accompanying drawings, Figure 1 is a central vertical sectional elevation of the lower portion of a gyratory crusher embodying my invention; Fig. 2, a plan partly broken away, of the lower portion of the gear chamber; Fig. 3, a detail view of a portion of the rotatable sleeve seat; Fig. 4, a sectional view taken upon plane of line 7—7 Fig. 3, and also showing the anti-friction floating ring and adjacent parts in section; Fig. 5, is an edge view of the anti-friction bearing rings; Fig. 6, a top view thereof; and Fig. 7, a transverse section of a portion thereof, on an enlarged scale.

In the apparatus illustrated in the drawings the general arrangement and operation of the parts is substantially the same as in others of this type, consisting essentially of a truncated conical crushing head $a$, rigidly secured to the shaft A, and gyrated thereby in an oppositely inclined concave crushing chamber $b$, from the lower portion of which the reduced material drops into the chute chamber $c$, in the usual manner. The lower portion of the gyratory shaft A, is journaled in the eccentric bearing $d$, seated in the rotatable sleeve $e$, to which the driving gear $e^1$, is secured—said driving gear $e^1$, being rotated by the pinion $p$, on the power shaft P, as indicated in Fig. 1. The sleeve $e$, is formed with an annular flange $e^2$, by which it is rotatably supported on the lower casing or bottom plate $g$—a floating ring $f$, being interposed between said annular flange $e^2$, and the actual rest or seat $g^1$. This floating ring $f$, is shown more particularly in Figs. 4, 5, 6 and 7. Both sides of this anti-friction or floating ring $f$, are formed with reverse angled oil grooves $f^1, f^1$, the edges of which are beveled backward as shown on an enlarged scale in Fig. 7, so that no matter which way the ring may turn under the influence of rotation of the eccentric a film of oil will always be carried in between the surfaces of the ring $f$, and the opposed surfaces of the wearing rings $e^3$, $g^3$, which are attached respectively to the sleeve flange $e^2$, and to the bearing seat $g^1$ (see Fig. 4). The floating anti-friction ring $f$, is centralized and held in position by equidistant abutments $g^4$, on the lower casing $g$; and surrounding the seat $g^1$, is an annular gutter $g^5$, to receive the oil which issues from between the floating ring $f$, and the wearing rings $e^3$, $g^3$. The bottom of this annular gutter is inclined as indicated by dotted line in Fig. 1 to conduct the oil thus received into a pocket $g^6$, from which the oil is returned through a duct $g^7$, to the space in the casing below the shaft, bearing and sleeve, to again percolate upward by capillary attraction between the opposed surfaces to be lubricated, as indicated by the arrows in Fig. 1. The rotation of the parts, and particularly the grooving of the floating ring $f$, insures a circulation of the oil which is most effective in lubricating the parts and reducing wear; and the return of the oil (heretofore allowed to overflow and escape) not only effect a saving in the cost of oil used, but obviates all danger of injury from lack of lubrication through failure of supply, as has heretofore frequently happened through carelessness or indifference on the part of attendants. Furthermore the pocket $g^6$, acts as a repository for precipitates taken up by the oil, eliminating them from the circulation, which is automatic and continuous during the operation of the machine.

$g^8$ is a duct through which oil may be introduced as required to maintain the proper level, which it will be noted is sufficiently high to submerge all the rotative bearing surfaces.

In order to exclude all dust from the lubricant and operative parts to be protected thereby, I close the top of the sleeve $e$, and the top of the gear chamber $h$, by means of dust guards or collars M, M.

The provision of the automatic system of lubrication herein set forth is of vast importance to operators and owners of crushers. In all other crushers, so far as I am aware the lubricating oil overflows into the inside of the bottom plate and escapes to the ground or concrete floor in under the crusher. The waste of oil, however, is not the most serious matter, while it amounts to a great deal in dollars and cents in a year, as the stream carried over and wasted in this way is probably about the size of a small straw, which, of course, is quite a waste; but as this oil is wasted, then the top of the eccentric is not lubricated, and heating and wearing of the metal of the sleeve and shaft are excessive and not infrequently the Babbitt metal is melted out, which necessitates costly repairs and shut-downs, and if an operator should neglect to put oil in the eccentric for a short time, the both parts of the machine would be burnt out. These features of my present invention, the automatic return circulation of the lubricant, and the reduction of frictional resistance by the grooved floating bearing ring, add materially to the life and efficiency of the apparatus. In fact I thereby attain a smooth-running machine which may be operated indefinitely without need of shut down or dismantling for repair or duplication of parts, and which requires so little care and attention that it is essentially fool-proof,—at least in so far as lubrication is concerned, lubrication being so indispensable to the life of the machine that lack of it for even a short period is sufficient to render the apparatus useless. Hence this feature of automatic lubrication, while simple in character, is of great practical importance, and a decided advance in the state of the art. Incidentally, it effects a material saving in the cost of oil used.

What I claim as my invention and desire to secure by Letters Patent is,

1. In crushing mechanism of the character designated, the combination with a gyratory shaft, eccentric bearing rotatable sleeve and casing of a floating anti-friction ring interposed between said rotatable sleeve and its seat, the sides of said ring being formed with reverse angled oil grooves, each consisting of a relatively deep channel with sloping surfaces extending back from the edges thereof and merging into the bearing surface of the ring substantially in the manner and for the purpose set forth.

2. In crushing mechanism of the character designated, the combination with the gyratory shaft, eccentric bearing, rotatable sleeve and casing, of a grooved anti-friction ring interposed between said rotatable sleeve and its seat, said casing for said bearing and sleeve being formed with an annular oil collecting gutter and a return conduit connecting said annular gutter with the lower part of the casing whereby a return circulation of lubricating oil is effected during the operation of the machine for the purpose described.

3. In crushing mechanism of the character designated, the combination with the gyratory shaft, eccentric bearing, rotatable sleeve and casing, of a grooved anti-friction ring interposed between said rotatable sleeve and its seat, said casing for said bearing and sleeve being formed with an inclined annular oil collecting gutter, a pocket with which the lower part of the inclined annular oil collecting gutter communicates, and a return duct leading from said pocket to the lower part of the casing, for the purpose set forth.

4. In crushing mechanism of the character designated, the combination with the gyratory shaft, eccentric bearing, rotatable sleeve and casing, of an annular grooved anti-friction plate interposed between the rotatable sleeve and its seat, said casing for said bearing, sleeve, and anti-friction plate being formed with an annular oil collecting gutter and a return conduit connecting said annular oil gutter with the lower part of the casing, whereby a forced return circulation of lubricant is effected and maintained during the operation of the machine, for the purpose set forth.

5. In crushing mechanism of the character designated, the combination with the gyratory shaft, eccentric bearing, rotatable sleeve and casing, of an annular floating anti-friction plate interposed between the said rotatable sleeve and its seat, and annular wearing plates interposed between said floating anti-friction plate and the rotatable sleeve and its seat and secured to said sleeve and seat respectively as and for the purpose set forth.

6. In crushing mechanism of the character designated, the combination with the gyratory shaft, eccentric bearing, rotatable sleeve and casing, of a floating anti-friction ring interposed between said rotatable sleeve and its seat, and means for feeding a suitable lubricant to said floating anti-friction ring, for the purpose described.

7. In crushing mechanism of the character designated, the combination with a gyratory shaft, eccentric bearing and rotatable sleeve and casing, of a grooved anti-friction ring interposed between said rotatable sleeve and its seat, said casing for said bearing and sleeve being formed with an annular oil collecting gutter above the bearing surfaces, and a return conduit connecting said annular oil gutter with the lower part of the casing below the bearing surfaces to be lubricated, whereby a return circulation of lubricating oil is effected during the operation of the machine for the purpose described.

JOSEPH E. KENNEDY.

Witnesses:
HARRY J. KENNEDY,
FLORENCE E. DOWNING.